(12) United States Patent
Heo et al.

(10) Patent No.: US 11,817,600 B2
(45) Date of Patent: Nov. 14, 2023

(54) SECONDARY BATTERY AND METHOD FOR MANUFACTURING THE SECONDARY BATTERY

(71) Applicant: LG CHEM, LTD., Seoul (KR)

(72) Inventors: Ha Young Heo, Daejeon (KR); Duk Hyun Ryu, Daejeon (KR); Hyoung Kwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 174 days.

(21) Appl. No.: 16/962,342

(22) PCT Filed: Nov. 20, 2019

(86) PCT No.: PCT/KR2019/015938
§ 371 (c)(1),
(2) Date: Jul. 15, 2020

(87) PCT Pub. No.: WO2020/111641
PCT Pub. Date: Jun. 4, 2020

(65) Prior Publication Data
US 2020/0343503 A1    Oct. 29, 2020

(30) Foreign Application Priority Data

Nov. 28, 2018 (KR) .................. 10-2018-0149832

(51) Int. Cl.
*H01M 50/342* (2021.01)
*H01M 50/578* (2021.01)
*H01M 50/147* (2021.01)

(52) U.S. Cl.
CPC ..... *H01M 50/3425* (2021.01); *H01M 50/147* (2021.01); *H01M 50/578* (2021.01); *H01M 2200/20* (2013.01)

(58) Field of Classification Search
CPC .......... H01M 50/3425; H01M 50/152; H01M 50/578; H01M 2200/20; H01M 50/03
See application file for complete search history.

(56) References Cited

U.S. PATENT DOCUMENTS

| | | | |
|---|---|---|---|
| 2004/0265683 A1* | 12/2004 | Merrill .................. | H01M 50/10 429/185 |
| 2006/0275657 A1* | 12/2006 | Kozuki ............. | H01M 50/3425 429/185 |

(Continued)

FOREIGN PATENT DOCUMENTS

| | | |
|---|---|---|
| CN | 102544397 A | 7/2012 |
| JP | WO2012/147782 A1 | 11/2012 |

(Continued)

OTHER PUBLICATIONS

Pedersen, Niels L. "On optimization of interference fit assembly." Structural and multidisciplinary optimization 54.2 (2016): 349-359. (Year: 2016).*

(Continued)

*Primary Examiner* — Niki Bakhtiari
*Assistant Examiner* — Grace Ann Kenlaw
(74) *Attorney, Agent, or Firm* — Birch, Stewart, Kolasch & Birch, LLP

(57) ABSTRACT

A method for manufacturing a secondary battery is provided, the method including a first step of providing a top cap and a safety vent, a second step of bending an end portion of the safety vent upward, and a third step of inserting the top cap inside the safety vent. An outer diameter A of the top cap is greater than an inner diameter B of the safety vent between the second step and the third step. A secondary battery is also provided.

9 Claims, 3 Drawing Sheets

(56) References Cited

U.S. PATENT DOCUMENTS

| | | |
|---|---|---|
| 2007/0212595 A1 | 9/2007 | Kim et al. |
| 2010/0159310 A1 | 6/2010 | Kim |
| 2014/0038005 A1 | 2/2014 | Yamato et al. |
| 2016/0049623 A1* | 2/2016 | Lee .................... H01M 50/103 |
| | | 429/185 |
| 2017/0207439 A1* | 7/2017 | Park .................... H01M 50/152 |
| 2018/0026238 A1* | 1/2018 | Andou ................ H01M 50/147 |
| | | 429/185 |

FOREIGN PATENT DOCUMENTS

| | | |
|---|---|---|
| JP | 2016-164872 A | 9/2016 |
| KR | 10-2003-0088770 A | 11/2003 |
| KR | 10-2007-0093171 A | 9/2007 |
| KR | 10-2008-0109949 A | 12/2008 |
| KR | 10-2013-0008330 A | 1/2013 |
| KR | 10-2016-0029230 A | 3/2016 |
| KR | 10-2017-0087281 A | 7/2017 |
| KR | 10-1767347 B1 | 8/2017 |
| KR | 10-2018-0082776 A | 7/2018 |

OTHER PUBLICATIONS

International Search Report for PCT/KR2019/015938 dated Feb. 27, 2020.
Extended European Search Report for European Application No. 19889498.2, dated Feb. 2, 2021.

* cited by examiner

SECONDARY BATTERY AND METHOD FOR MANUFACTURING THE SECONDARY BATTERY

CROSS-REFERENCE TO RELATED APPLICATION

The present application claims the benefit of the priority of Korean Patent Application No. 10-2018-0149832, filed on Nov. 28, 2018, which is hereby incorporated by reference in its entirety.

TECHNICAL FIELD

The present invention relates to a secondary battery and a method for manufacturing the secondary battery.

BACKGROUND ART

Secondary batteries that are repeatedly chargeable and dischargeable may be classified into a pouch type, a prismatic type, a cylindrical type, or the like depending on structures thereof.

Among these types, a cylindrical secondary battery has a structure in which a top cap is coupled to an upper portion of a battery can that accommodates an electrode assembly. Also, in the cylindrical secondary battery, a safety vent, which is below the top cap and ruptured when an internal pressure of the secondary battery increases so as to discharge a gas to the outside, is typically coupled to the top cap and the battery can.

According to the related art, during manufacturing of the cylindrical secondary battery, the top cap is provided inside the safety vent of which a circumferential portion is bent upward, and then a circumferential portion of the safety vent is bent again in a direction toward the top cap.

However, since the top cap has to be provided inside the safety vent as described above, the outer diameter of the top cap has to be smaller than the inner diameter inside the safety vent. Thus, in the finished cylindrical secondary battery, there may necessarily be a gap between the inside of the safety vent and the outside of the top cap. According to the related art, an electrolyte within the secondary battery may leak due to the gap.

DISCLOSURE OF THE INVENTION

Technical Problem

Thus, an object of the present invention is to solve a leakage of an electrolyte that may occur in the cylindrical secondary battery manufactured according to the related art.

Technical Solution

According to one aspect of the present invention in order to achieve the object described above, a method for manufacturing a secondary battery is provided, the method including: providing a top cap and a safety vent; bending an end portion of the safety vent upward; and inserting the top cap inside the safety vent, wherein, after bending the end portion of the safety vent upward but prior to inserting the top cap inside the safety vent, an outer diameter (A) of the top cap is greater than an inner diameter (B) of the safety vent.

After bending the end portion of the safety vent upward but prior to inserting the top cap inside the safety vent, outer diameter (A) of the top cap may be greater than the inner diameter (B) of the safety vent by 0.01 mm to 0.03 mm.

A contact pressure applied between the top cap and the safety vent after inserting the top cap inside the safety vent may be greater than or equal to a pressure ($P_v$) that is a pressure within the secondary battery when a gas within the secondary battery begins to be discharged through the safety vent.

The top cap may be made of steel plate cold commercial, stainless steel, or aluminum, and the safety vent may be made of aluminum.

A contact pressure applied between a side portion of the top cap and the safety vent after inserting the top cap inside the safety vent may be 7.0 MPa or less.

A ratio ((A−B)/A) of a difference (A−B) between the outer diameter (A) of the top cap and the inner diameter (B) of the safety vent to the outer diameter (A) of the top cap may be $5.4 \times 10^{-4}$ to $1.62 \times 10^{-3}$.

A ratio ((A−B)/B) of a difference (A−B) between the outer diameter (A) of the top cap and the inner diameter (B) of the safety vent to the inner diameter (B) of the safety vent may be $5.4 \times 10^{-4}$ to $1.62 \times 10^{-3}$.

The method may further include, after inserting the top cap inside the safety vent, additionally bending the end portion of the safety vent in a central direction of the safety vent.

The contact pressure applied to a central area of areas between the side portion of the top cap and the safety vent after inserting the top cap inside the safety vent may be 3.5 MPa or less.

According to another aspect of the present invention in order to achieve the object described above, a secondary battery is provided, which includes: a battery can; a top cap coupled to an upper portion of the battery can; and a safety vent provided below the top cap, wherein an end portion of the safety vent is bent upward to form a bent portion, the bent portion of the safety vent contacts a side portion of the top cap, and a contact pressure between the bent portion of the safety vent and the side portion of the top cap is 0.7 MPa to 7.0 MPa.

The contact pressure applied to a central area of areas between the bent portion of the safety vent and the side portion of the top cap may be 3.5 MPa or less.

Advantageous Effects

According to the present invention, the leakage of the electrolyte, which may occur due to the gap between the safety vent and the top cap in the cylindrical secondary battery, may be prevented.

MODE FOR CARRYING OUT THE INVENTION

Hereinafter, a method for manufacturing a secondary battery according to the present invention will be described with reference to the accompanying drawings.

Here, the secondary battery according to the present invention may be a cylindrical secondary battery.

Method for Manufacturing a Secondary Battery

Figure 1:
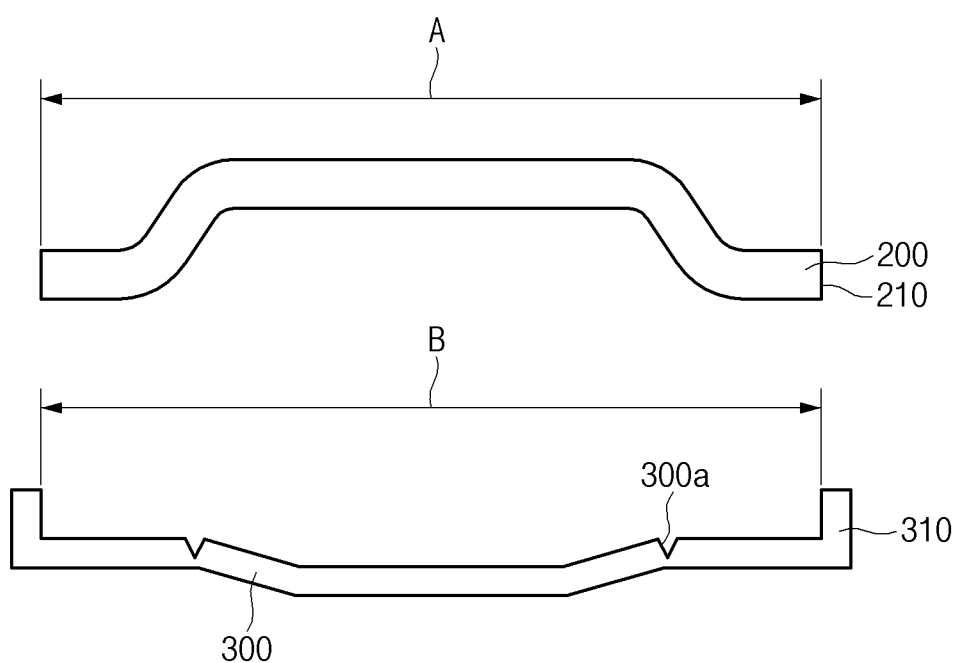
FIG. 1 is a side cross-sectional view individually illustrating structures of a top cap and a safety vent according to the present invention.
Figure 2:
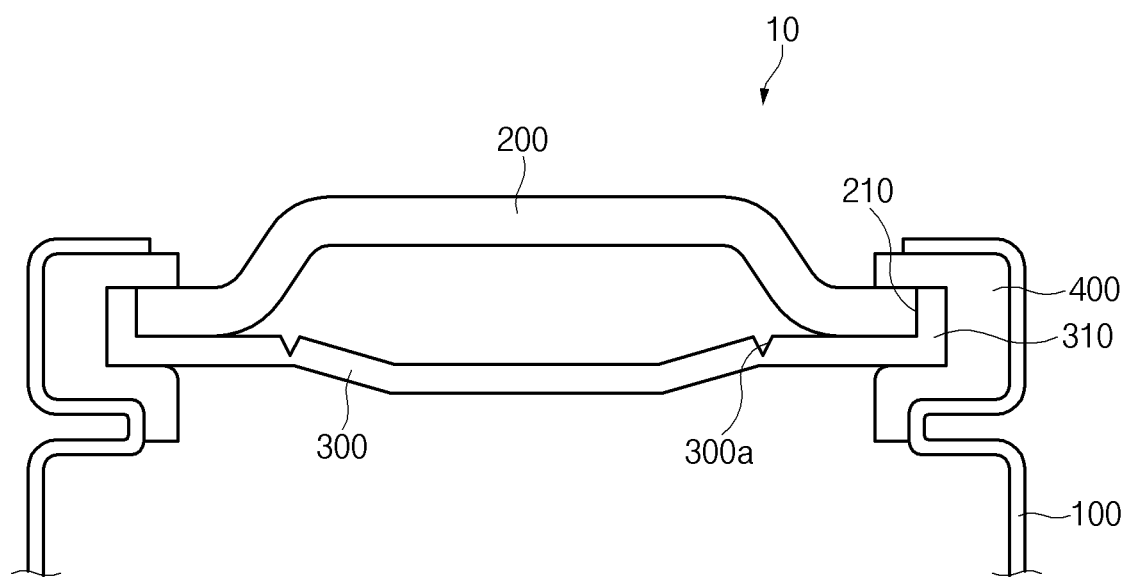
FIG. 2 is a side cross-sectional view illustrating an upper structure of a secondary battery according to the present invention.

FIG. 1 is a side cross-sectional view individually illustrating structures of a top cap and a safety vent according to the present invention, and FIG. 2 is a side cross-sectional view illustrating an upper structure of a secondary battery according to the present invention.

A method for manufacturing the secondary battery according to the present invention may include a first step of providing a top cap 200 and a safety vent 300. The top cap 200 may be configured to be coupled to an upper portion of a battery can 100 (see FIG. 2). Here, as illustrated in FIG. 1, the circumference of the top cap 200 may have a circular shape with the outer diameter A. Also, the top cap 200 may be made of a material of steel plate cold commercial, stainless steel, or aluminum.

Here, in the safety vent 300, a notch portion 300a may be formed having a thickness smaller than those in other areas of the safety vent 300. An internal pressure of the secondary battery may increase due to an increase in temperature within the secondary battery or the like. When the internal pressure of the secondary battery exceeds a certain pressure, the notch portion 300a of the safety vent 300 is ruptured, and thus a gas within the secondary battery may be discharged to the outside through the notch portion 300a and a discharge hole (not shown) of the top cap 200. Therefore, an explosion of the secondary battery due to the increase in internal pressure of the secondary battery may be prevented.

Also, the method for manufacturing the secondary battery according to the present invention may further include a second step of bending an end portion of the safety vent 300 upward. As illustrated in FIG. 1, a bent portion 310 having a shape that is bent upward may be formed in the end portion of the safety vent 300 through the second step. Here, as illustrated in FIG. 1, an inside portion of the safety vent 300 in which the bent portion 310 is formed may have a circular shape with the inner diameter B. Also, the safety vent 300 may be made of an aluminum material.

Referring to the drawings again, the method for manufacturing the secondary battery according to the present invention may further include a third step of inserting the top cap 200 inside the safety vent 300. Between the second step and the third step, the outer diameter A of the top cap 200 may be greater than the inner diameter B of the safety vent 300.

On the basis of a structure of the cylindrical secondary battery according to the related art, since the top cap has to be provided inside the safety vent, the outer diameter of the top cap has to be smaller than the inner diameter of the safety vent. Thus, there may necessarily be a gap between the inside of the safety vent and the outside of the top cap in the cylindrical secondary battery which is finished according to the related art. As a result, there is a risk that an electrolyte may leak.

However, according to the present invention, the outer diameter of the top cap is made greater than the inner diameter of the safety vent, and thus there may be no gap between the outside of the top cap and the inside of the safety vent when the top cap and the safety vent are coupled to each other in the third step. Therefore, since there is no gap between the outside of the top cap and the inside of the safety vent unlike the related art, leakage of the electrolyte from a space between the outside of the top cap and the inside of the safety vent may be prevented unlike the related art.

Here, a ratio ((A−B)/A or (A−B)/B) of a difference (A−B) between the outer diameter A of the top cap 200 and the inner diameter B of the safety vent 300 to the outer diameter A of the top cap 200 or the inner diameter B of the safety vent 300 may be $5.4 \times 10^{-4}$ to $1.62 \times 10^{-3}$.

When (A−B)/A or (A−B)/B is less than $5.4 \times 10^{-4}$, a contact pressure between the top cap 200 and the safety vent 300 becomes too small, and thus the top cap 200 may be separated from the safety vent 300 and fly off as an internal pressure of a secondary battery 10 increases. Also, when (A−B)/A or (A−B)/B is greater than $1.62 \times 10^{-3}$, an internal stress of the top cap 200 or the safety vent 300 increases excessively as the contact pressure between the top cap 200 and the safety vent 300 increases excessively, and thus the top cap 200 or the safety vent 300 may be damaged during coupling of the top cap 200 to the safety vent 300 or when the secondary battery 10 is being used.

As described above, in the method for manufacturing the secondary battery according to the present invention, since the outer diameter A of the top cap 200 is greater than the inner diameter B of the safety vent 300 between the second step and the third step, interference fit coupling may be established between the top cap 200 and the safety vent 300 through the third step. Thus, a pressure may be mutually applied to the area in which the top cap 200 and the safety vent 300 are in close contact with each other after the third step. That is, as illustrated in FIG. 2, a contact pressure may be applied between a side portion 210 of the top cap 200 and the bent portion 310 of the safety vent 300.

The contact pressure needs to be greater than the pressure within the secondary battery 10. This is because the top cap 200 may be spaced apart from the safety vent 300 due to the pressure inside the secondary battery 10 if the contact pressure is less than the pressure within the secondary battery 10.

In particular, the top cap 200 is being coupled to the safety vent 300 not only when the secondary battery 10 operates normally but in a case in which the notch portion 300a is ruptured by an abnormal increase in internal pressure of the secondary battery 10, and a gas within the secondary battery 10 is discharged to the outside. This is because a safety accident caused by the top cap 200 may occur if the top cap 200 is separated from the safety vent 300 and flies off as the internal pressure of the secondary battery 10 increases abnormally.

Thus, in the method for manufacturing the secondary battery according to the present invention, the contact pressure applied between the top cap 200 and the safety vent 300 after the third step may be greater than or equal to a pressure $P_v$ that is a pressure within the secondary battery when the gas within the secondary battery 10 begins to be discharged through the safety vent 300. In this case, even though the internal pressure of the secondary battery 10 increases abnormally, a safety accident, which is likely to occur when the top cap 200 is separated from the safety vent 300 and flies off, may be prevented. Here, $P_v$ is 1.3 MPa to 3.0 MPa.

Here, the outer diameter A of the top cap 200 may be greater than the inner diameter B of the safety vent 300 by 0.01 mm to 0.03 mm.

When A is greater than B by less than 0.01 mm, the contact pressure between the top cap 200 and the safety vent 300 becomes too small, and thus the top cap 200 may be separated from the safety vent 300 and fly off as the internal pressure of the secondary battery 10 increases. On the other hand, when A is greater than B by more than 0.03 mm, the internal stress of the top cap 200 or the safety vent 300 increases excessively as the contact pressure between the top cap 200 and the safety vent 300 increases excessively, and thus the top cap 200 or the safety vent 300 may be damaged during coupling of the top cap 200 to the safety vent 300 or when the secondary battery 10 is being used. More preferably, the outer diameter A of the top cap 200 may be greater than the inner diameter B of the safety vent 300 by 0.01 mm to 0.02 mm.

Here, the contact pressure between the side portion 210 of the top cap 200 and the bent portion 310 of the safety vent 300 after the third step may be 7.0 MPa or less over all areas where the side portion 210 of the top cap and the bent portion 310 face each other. Also, the contact pressure, which is applied after the third step to a central area of the areas where the side portion 210 of the top cap 200 and the bent portion 310 of the safety vent 300 face each other, may be 3.5 MPa or less.

When the contact pressure is 7.0 MPa or less over all the areas where the side portion 210 of the top cap 200 and the bent portion 310 of the safety vent 300 face each other, the top cap 200 or the safety vent 300 may be prevented from being damaged due to the interference fit coupling between the top cap 200 and the safety vent 300.

Here, the contact pressure may be particularly high on an upper or a lower area among the areas where the side portion 210 of the top cap 200 and the bent portion 310 of the safety vent 300 come into contact with each other, but the contact pressure may be relatively low on the central area. Thus, when the contact pressure on the central region among the areas where the side portion 210 of the top cap and the bent portion 310 of the safety vent come into contact with each other is 3.5 MPa or less, the contact pressure over all the areas where the side portion 210 of the top cap and the bent portion 310 of the safety vent come into contact with each other may be 7.0 MPa or less.

Here, the bent portion 310 of the safety vent 300 may have a U-shape other than an L-shape which is bent upward as illustrated in FIGS. 1 and 2. To this end, the method for manufacturing the secondary battery according to the present invention may further include a fourth step of additionally bending the end portion of the safety vent in a direction toward a center of the safety vent.

Hereinafter, a structure of the secondary battery according to the present invention will be described with reference to the drawings.

Secondary Battery

As illustrated in FIGS. 1 and 2, the secondary battery 10 according to the present invention may include the battery can 100, the top cap 200 coupled to an upper portion of the battery can 100, and the safety vent 300 provided below the top cap 200.

Here, the end portion of the safety vent 300 may be bent upward to form the bent portion 310, and the bent portion 310 of the safety vent 300 may come into contact with the side portion 210 of the top cap 200. Also, a gasket 400 may be provided between the side portion of the safety vent 300 and an inner surface of the battery can 100.

Also, the contact pressure may be applied between the bent portion 310 of the safety vent and the side portion 210 of the top cap according to the present invention. Here, the contact pressure may be 0.7 MPa or 7.0 MPa. Also, the contact pressure applied to the central area of the areas between the bent portion 310 of the safety vent and the side portion 210 of the top cap may be 3.5 MPa or less.

Embodiment 1

On the Abaqus program, a safety vent and a top cap were coupled to each other by inserting the top cap inside the safety vent which has bent portions bent upward from both end portions thereof. A material of the safety vent was aluminum, and a material of the top cap was steel plate cold commercial. Also, the yield strength of the aluminum used in the safety vent was 125 MPa, and the yield strength of the steel plate cold commercial used in the top cap was 250 MPa.

The thickness of the safety vent was 0.3 mm, and the thickness of the top cap was 0.7 mm. A notch portion was formed in the safety vent.

In Embodiment 1, the inner diameter of the safety vent was 18.495 mm, and the outer diameter of the top cap was 18.505 mm.

Embodiment 2

A safety vent and a top cap were coupled to each other in the same manner as Embodiment 1, except that the inner diameter of the safety vent is 18.49 mm, and the outer diameter of the top cap is 18.51 mm.

Embodiment 3

A safety vent and a top cap were coupled to each other in the same manner as Embodiment 1, except that the inner diameter of the safety vent is 18.485 mm, and the outer diameter of the top cap is 18.515 mm.

Comparative Example

A safety vent and a top cap were coupled to each other in the same manner as Embodiment 1, except that the inner diameter of the safety vent is 18.48 mm, and the outer diameter of the top cap is 18.52 mm.

Experimental Example

Figure 3:
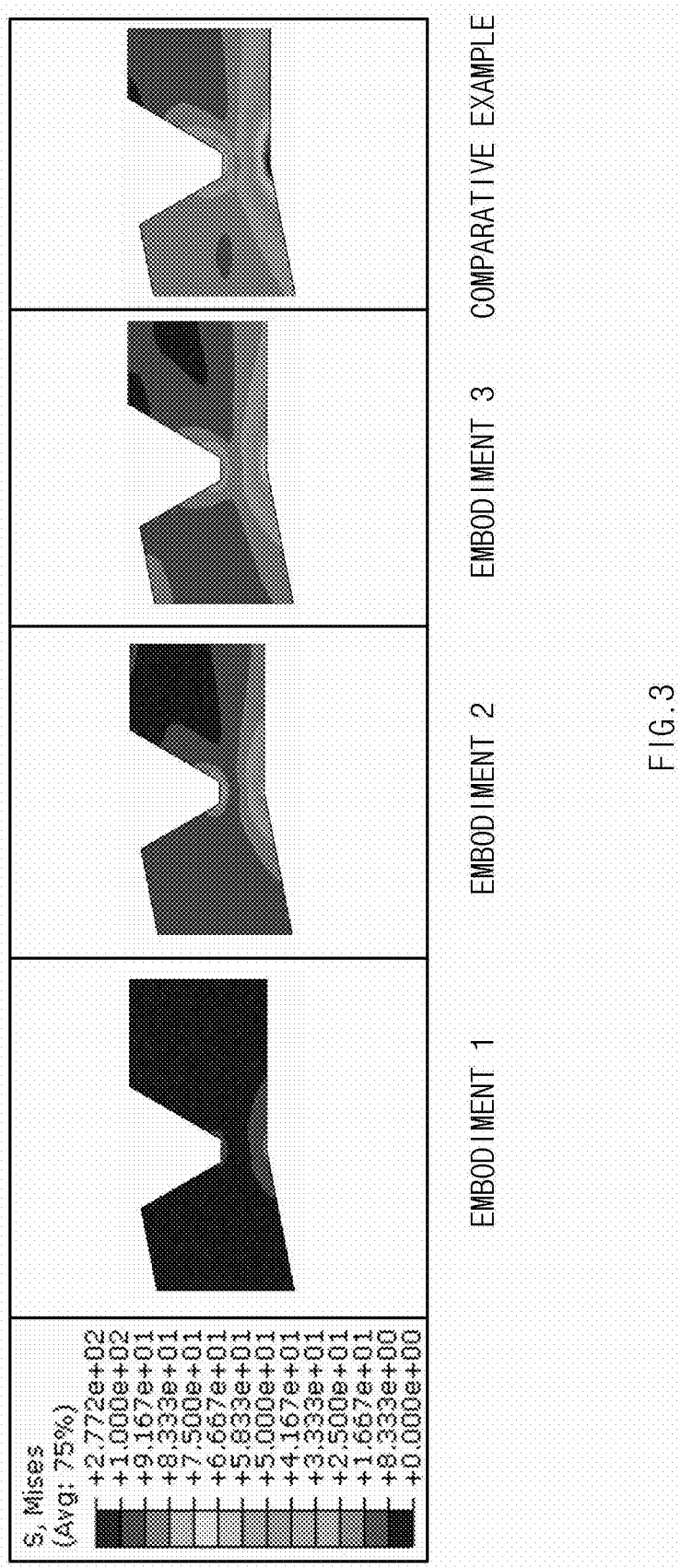
FIG. 3 is a simulation result in which stresses inside safety vents among top caps and safety vents coupled to each other according to Embodiments of the present invention and Comparative Example are visually represented.

On the Abaqus program, stresses acting on the safety vent and the top cap coupled to each other in Embodiments and Comparative Example were measured. FIG. 3 is a simulation result in which stresses inside the safety vents among the top caps and the safety vents coupled to each other according to Embodiments of the present invention and Comparative Example are visually represented. Each of areas, which is recessed downward, is a notch portion.

As illustrated in FIG. 3, it is confirmed that a relatively high stress occurs in an area of the notch portion in each of the safety vents among the safety vents and the top caps coupled to each other according to Embodiments and Comparative Example. Particularly, it is confirmed that a relatively higher stress occurs in the notch portion of each of the safety vents in Embodiments and Comparative Example and a lower area of the notch portion when compared to other areas.

More particularly, when comparing Embodiment 1 and Embodiment 2, it is confirmed that a relatively higher stress occurs in the safety vent in Embodiment 2 than in Embodiment 1. Also, when comparing Embodiment 2 and Embodiment 3, it is confirmed that a relatively higher stress occurs in the safety vent in Embodiment 3 than in Embodiment 2.

However, as illustrated in FIG. 3, it is confirmed that a stress which occurs in each of the safety vents including the notch portions in Embodiments 1 to 3 of the present invention is relatively lower than the yield strength of the aluminum used in the safety vent. That is, it is confirmed that the yield strength of the aluminum used in each of the safety vents in Embodiments of the present invention and Comparative Example is 125 MPa as described above, but the stress occurring in each of the safety vents in Embodiments 1 to 3 is less than 100 MPa over all areas of the safety vent. Particularly, it is confirmed that the stress occurring in the safety vent in Embodiment 1 is less than 25 MPa over all areas of the safety vent.

On the other hand, it is confirmed that the stress occurring in the safety vent in Comparative Example rapidly increases as illustrated in FIG. 3. Particularly, it is confirmed that the stress exceeding 100 MPa, which is 80% of the yield strength of the aluminum used in the safety vent, occurs in the lower area of the notch portion of the safety vent, and thus the durability of the safety vent is significantly deteriorated.

Although the present invention is described by specific embodiments and drawings as described above, the present invention is not limited thereto and it is obvious that various changes and modifications may be made by those having ordinary skill in the art within the technical idea of the present invention and equivalent scope of the appended claims.

The invention claimed is:

1. A method for manufacturing a secondary battery, the method comprising:
   providing a top cap and a safety vent, the top cap having a side part defining an outermost perimeter of the top cap;
   bending an end portion of the safety vent upward to provide a vertical wall portion; and
   after bending the end portion of the safety vent upward, inserting the top cap inside the safety vent such that the top cap contacts the vertical wall portion at the outermost perimeter of the top cap,
   wherein, after bending the end portion of the safety vent upward but prior to inserting the top cap inside the safety vent, an outer diameter (A) of the outermost perimeter of the top cap is greater than an inner diameter (B) of the vertical wall portion of the safety vent, and
   wherein, after inserting the top cap inside the safety vent, a contact pressure applied between the top cap and the safety vent is higher on an upper or a lower area among areas where the side part of the top cap and the vertical wall portion of the safety vent come into contact with each other, and the contact pressure is lower on a central area wherein the side part of the top cap and the vertical wall portion of the safety vent come into contact with each other.

2. The method of claim 1, wherein, after bending the end portion of the safety vent upward but prior to inserting the top cap inside the safety vent, the outer diameter (A) of the outermost perimeter of the top cap is greater than the inner diameter (B) of the vertical wall portion of the safety vent by 0.01 mm to 0.03 mm.

3. The method of claim 1, wherein the contact pressure applied between the top cap and the safety vent after inserting the top cap inside the safety vent is greater than or equal to a pressure ($P_v$) that is a pressure within the secondary battery when a gas within the secondary battery begins to be discharged through the safety vent.

4. The method of claim 1, wherein the top cap is made of steel plate cold commercial, stainless steel, or aluminum, and
   wherein the safety vent is made of aluminum.

5. The method of claim 1, wherein the contact pressure applied between the side part of the top cap and the safety vent after inserting the top cap inside the safety vent is 7.0 MPa or less.

6. The method of claim 1, wherein a ratio ((A−B)/A) of a difference (A−B) between the outer diameter (A) of the outermost perimeter of the top cap and the inner diameter (B) of the vertical wall portion of the safety vent to the outer diameter (A) of the outermost perimeter of the top cap is $5.4 \times 10^{-4}$ to $1.62 \times 10^{-3}$.

7. The method of claim 1, wherein a ratio ((A−B)/B) of a difference (A−B) between the outer diameter (A) of the outermost perimeter of the top cap and the inner diameter (B) of the vertical wall portion of the safety vent to the inner diameter (B) of the vertical wall of the safety vent is $5.4 \times 10^{-4}$ to $1.62 \times 10^{-3}$.

8. The method of claim 1, further comprising, after inserting the top cap into the safety vent, additionally bending the end portion of the safety vent in a central direction of the safety vent.

9. The method of claim 5, wherein the contact pressure applied to the central area between the side part of the top cap and the safety vent after inserting the top cap inside the safety vent is 3.5 MPa or less.

* * * * *